US008395913B2

(12) United States Patent
Torrico-Bascopé

(10) Patent No.: US 8,395,913 B2
(45) Date of Patent: *Mar. 12, 2013

(54) METHOD AND DEVICE OF ELECTRICAL POWER

(75) Inventor: Grover Victor Torrico-Bascopé, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,021

(22) Filed: Oct. 10, 2011

(65) Prior Publication Data

US 2012/0032651 A1    Feb. 9, 2012

Related U.S. Application Data

(63) Continuation of application No. 13/161,188, filed on Jun. 15, 2011, which is a continuation of application No. PCT/CN2010/075564, filed on Jul. 29, 2010.

(30) Foreign Application Priority Data

May 24, 2010    (WO) ................ PCT/SE2010/000140

(51) Int. Cl.
*H02M 1/12* (2006.01)
*H02M 1/14* (2006.01)

(52) U.S. Cl. ........................................... 363/47

(58) Field of Classification Search ............... 363/37, 363/47, 59, 124, 126; 323/208
See application file for complete search history.

(56) References Cited

U.S. PATENT DOCUMENTS

| 5,444,609 | A | * | 8/1995 | Swamy et al. ............... 363/47 |
| 5,844,791 | A | | 12/1998 | Swamy |
| 5,903,066 | A | * | 5/1999 | Enjeti et al. .................. 363/39 |
| 6,690,588 | B2 | * | 2/2004 | York ............................ 363/124 |
| 7,667,988 | B2 | * | 2/2010 | Haeberle et al. ............. 363/47 |
| 8,325,501 | B2 | * | 12/2012 | Torrico-Bascope ........... 363/47 |
| 2008/0285314 | A1 | * | 11/2008 | Kojori ........................... 363/37 |
| 2011/0286249 | A1 | * | 11/2011 | Torrico-Bascope ........ 363/124 |
| 2012/0032651 | A1 | | 2/2012 | Torrico-Bascopé |

FOREIGN PATENT DOCUMENTS

| CN | 2363421 Y | | 2/2000 |
| CN | 1555124 A | * | 12/2004 |
| RU | 2357352 C1 | | 5/2009 |
| TW | 446171 U | | 7/2001 |
| WO | WO 2008037668 A1 | | 4/2008 |
| WO | WO 2011/147117 A1 | | 12/2011 |

OTHER PUBLICATIONS

Zhao, Yifan et al. "Force Commutated Three Level Boost Type Rectifer" IEE Transactions on Industry Applications. vol. 3 No. 1 Jan./Feb. 1995:155-161.
Kolar, Johann W. et al. "Status of the Techniques of Three-Phase Rectifer Systems with Low Effects on the Mains." $21^{st}$ Intelec Jun. 6-9, 1999.
Bascopé,Grover V. Torrico "Generation of a Family of Non-Isolated Dc-Dc PWN Converters using New Three-State Switching Cells" IEEE 2000: 858-863.
Bascopé,Grover V. Torrico et al. A Single Phase PFC 3kW Converter Using a Three-State Switching Cell. $35^{th}$ Annual IEEE Power Electronics Specialists Conference. Aachen, Germany 2004:4037-4042.

(Continued)

*Primary Examiner* — Jue Zhang
(74) *Attorney, Agent, or Firm* — Brinks Hofer Gilson & Lione

(57) ABSTRACT

A power factor correction of three-phase boost-type conversion is disclosed. Embodiments comprising multi-leg autotransformers are disclosed, e.g. comprising 3-phase low-pass filtering impedances such as capacitors between an input of a converter and a midpoint of the output.

6 Claims, 6 Drawing Sheets

OTHER PUBLICATIONS

International Search Report issued in corresponding PCT Patent Application No. PCT/CN2010/075564, mailed Mar. 3, 2011.

Office Action mailed Jan. 24, 2012, issued in commonly owned U.S. Appl. No. 13/161,188, filed Jun. 15, 2011.

Kolar et al., "Status of the Techniques of Three-Phase Rectifier Systems with Low Effects on the Mains" 21st Intelec, Copenhagen, Denmark, Jun. 6-9, 1990.

Torrico-Bascopé et al, "A Single Phase PFC 3Kw Converter Using a Three-State Switching Cell" 35th Annual IEEE Power Electronics Specialists Conference. Aachen, Germany, 2004.

Torrico-Bascopé et al, "Generation of a Family of Non-Isolated DC-DC PWM Converters Using New Three-State Switching Cells" IEEE 2000.

Zhao et al., "Force Commutated Three Level Boost Type Rectifier" IEEE Transactions on Industry Applications, vol. 31, No. 1, Jan./Feb. 1995.

Notice of Allowance issued in commonly owned U.S. Appl. No. 13/161,188, mailed Oct. 18, 2012.

Office Action issued in commonly owned U.S. Appl. No. 13/161,188, mailed Jul. 9, 2012.

* cited by examiner

US 8,395,913 B2

METHOD AND DEVICE OF ELECTRICAL POWER

CROSS-REFERENCE TO RELATED APPLICATIONS

This application is a continuation of U.S. patent application Ser. No. 13/161,188, filed on Jun. 15, 2011, which is a continuation of International Application No. PCT/CN2010/075564, filed on Jul. 29, 2010. The International Application claims priority to International Application No. PCT/SE2010/000140, filed on May 24, 2010, all of which are hereby incorporated by reference in their entireties.

TECHNICAL FIELD

The present disclosure relates to power converter and multi-phase boost-type converters for power factor correction.

BACKGROUND

Power supplies for telecommunication equipment, are required to deliver a DC voltage for any type of application. The power supplies are powered by the AC-mains, where the voltage is rectified by means of a bridge rectifier, (other types) etc.

Power factor correction, PFC, circuits are often used in switched mode power supplies and rectifiers connected to the AC-mains. The PFC circuit reduces the harmonic contents in the current drawn from the mains, and controls the power factor to be close to unity. For this purpose, a boost converter is often used; especially at higher power levels.

Y. Zhao, Y. Li, and T. A. Lipo, "Force commutated three level boost type rectifier," IEEE Industry Applications Society Annual Meeting, pp. 771-777, vol. 2, 199; and J. W. Kolar e H. Ertl, "Status of the techniques of three-phase rectifier systems with low effects on the mains," IEEE International Telecommunications Energy Conference, p. 16, 1999 describes a three-level boost converter utility interface forming the basis of most three-phase boost converters found in the market today. The utility interface draws nearly sinusoidal current from a three phase utility with a power factor near unity.

U.S. Pat. No. 4,268,899, discloses single phase and three phase embodiments of a rectifier circuit operable as a full wave bridge or as a phase controlled voltage doubler depending on the line-load conditions. The circuit has its greatest power factor at high line conditions.

When high power is being processed, semiconductors like IGBT, MOSFET, diodes, GTO, MCT and others have been the chosen solution for the active switches in the applications found in the industry. However, using those devices has been related with many issues that are limiting the efficiency and/or power density like:
a. Current sharing between paralleled devices
b. Reduction of the switching frequency due to the increased commutation losses which increases the weight and the size of the unit.

Another drawback of the existing solutions is that the EMI-levels are too high and requires several stages in the input filter in order to reduce both the CM- and DM-noise. This reduces the performance and increases the volume/cost of the unit.

G. V. T. Bascopé e Ivo Barbi, "Generation of a family of non-isolated DC-DC PWM converters using a three-state switching cell", IEEE 31th Annual Power Electronics Specialists Conference, Volume: 2, pp. 858-863, 18-23 Jun., 2000, incorporated herein by reference, describes the concept of the three-state switching cell, 3SSC.

G. V. Torrico-Bascopé e I. Barbi, "A single phase PFC 3 kW converter using a three-state switching cell", IEEE 35th Annual Power Electronics Specialists Conference, Volume: 5, pp. 4037-4042, 20-25 Jun., 2004, describes an application of the 3SSC in a single-phase PFC circuit.

SUMMARY

One embodiment discloses a method of power factor correction of a 3-phase power converter. The method includes connecting each phase to a midpoint across an autotransformer.

A second embodiment discloses a device including an autotransformer inter-connecting each phase to a midpoint. The device corrects power factor of a 3-phase power converter.

DETAILED DESCRIPTION

Figure 1:
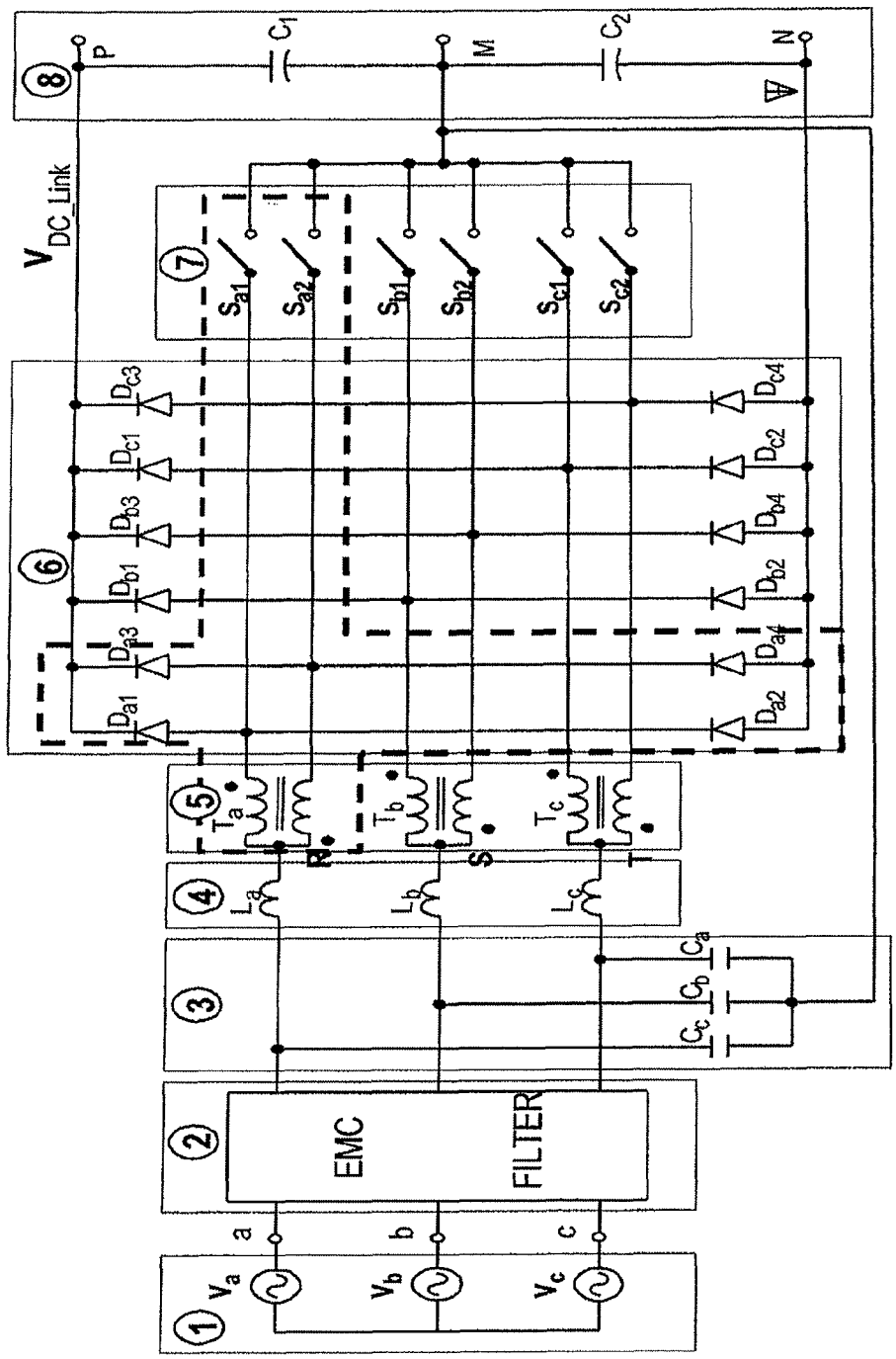
FIG. 1 illustrates a schematic diagram of an embodiment of a three-phase boost converter constructed in accordance with the disclosure.

The developing trend of the front-end three-phase converters is high efficiency and high power density. However, achieving high efficiency often results in lower power density.

Paralleling of converters has been a way to solve the demand of increasing DC-power, but due to the issues mentioned in the prior-art section, this is not an optimal solution for achieving high efficiency and high density.

Increasing the number of semiconductors, magnetic components and amount of copper; it would be possible as such to achieve high efficiency with prior-art circuit topologies on which circuits existing in the market today are based. This, however, would decrease power density. If a prior-art converter is to be optimized for high density, the efficiency will definitely be lower.

As a consequence, the choice for optimization in the existing solutions in today's prior art is either for high efficiency or high density, but not both.

Consequently, it is an object of embodied examples in accordance with the disclosure to provide circuits capable of achieving both high efficiency and high density.

A further object of an embodied multilevel circuit configuration is to facilitate reduced voltage and the current stress on the semiconductors.

Also, an object of embodied multilevel circuit configuration is to facilitate size, weight, and/or volume reduction of a converter, heat sink, input filter and/or reactive components of the converter unit.

Finally, it is an object of embodiments in accordance with the disclosure to facilitate use of semiconductors of relaxed requirements as compared to prior-art circuit topologies, given power-converter specifications.

A new topological circuit is presented, embodiments of which are capable of overcoming this inherent characteristic of prior art front-end three-phase converters. Example embodiments of this new converter demonstrate very high efficiency and high power density, as further explained in the detailed description.

Multi-level converters, lower the maximum voltage over the active switches with the number of voltage levels.

The disclosed multi-level topology is not limited to a particular number of levels. A three-level boost converter, however, provides a practical topology for use in high power, high input voltage, front end PFC circuits and facilitates fulfillment of the requirement of high efficiency. The main drawback of prior-art topologies based on the three-level boost converter, is that the EMI (Electromagnetic Interference) levels are too high. Embodiments of the disclosure reduce this drawback.

Embodied example circuits disclosed in this specification are capable of achieving both high efficiency and high density.

An approach that is most suitable for high power is using converters with multilevel features for voltage and current instead.

An advantage of an embodied multilevel circuit configuration is that the voltage and the current stress on the semiconductors are reduced with the increased number of levels in the converter. This will reduce the required cooling and thereby the size and volume of the unit.

Also, size, weight and volume of the reactive components of example embodiments are substantially reduced compared to what is the case in prio-art technology due to the reactive components operating at higher perceived frequency.

The limitations as described above and found in front-end converters used in the industry today have been solved by an embodied multilevel converter of circuit topology in accordance with the disclosure.

At the same time, the disclosed multilevel converter improves the EMI-performance, compared to what is achieved according to prior-art topologies. This facilitates, e.g., reduction of weight, size and volume of an input filter and thereby of a converter unit.

An object of an embodiment of the disclosure is to provide a novel topological circuit for a Three-Phase Boost Converter to use in different applications where high efficiency and high density are required. The Three-Phase Boost Converter includes multi-state (e.g. five-state) switching cell.

This novel topological circuit is based on the 3SSC (Three-State Switching Cell). As described above, the main characteristic of this circuit is the possibility to achieve high efficiency and high power density, due to the fact that the reactive components work with twice the switching frequency.

Due to the inherent characteristic of the 3SSC, the peak currents through the semiconductors are lower compared to prior-art circuit topologies and consequently the conduction and switching losses are lowered. This allows us to use cost effective semiconductors and smaller heat-sinks which will also reduce the total size of the unit.

Referring initially to FIG. 1, illustrated is a schematic diagram of an embodiment of a three-phase boost converter constructed in accordance with the disclosure. The boost converter receives input power from a three-phase voltage source (1) (via an EMI-filter, (2)). The example capacitors $C_{c1}$-$C_{c3}$ (3) are connected in a wye, or Y, configuration between the EMI-filter and the boost inductors, $L_a$, $L_b$, $L_c$ to the midpoint, M, (8) of the converter. It should be noted that having capacitor in a Y-configuration is a preferred mode. This does not exclude more general impedances or low-pass filters, nor does it require a particular Y configuration as long as the mid-point could be fixed to a corresponding reference through circuitry providing low-pass filter characteristics of the voltage. In an example realization, small capacitors in the range of some 300 nF or less, e.g. 220 nF, provide good performance in relation to other parameters of relevance. This low-pass filtering will reduce the "noise" of sample values of a sinusoid input voltage due to switching. It is substantially different from the EMC (Electromagnetic Compatibility) filtering providing filtering of the parasitic capacitance that commonly exists between active devices and a heat sink. The input power goes through first, second and third boost inductors $L_a$, $L_b$ and $L_c$ (4) and the autotransformers $T_a$, $T_b$ and $T_c$ (5) that are coupled to a rectifier (6) which includes a plurality of diodes, $D_{a1}$-$D_{a4}$, $D_{b1}$-$D_{b4}$ and $D_{c1}$-$D_{c4}$, arranged in a full bridge configuration. In the example illustration the autotransformers comprise two transformer windings or legs, each leg connected to the midpoint across a bi-directional switch (7). The rectifier (6) rectifies the three-phase input voltage into a DC voltage for application to the bi-directional controllable switches (7), $S_{a1}$, $S_{a2}$, $S_{b1}$, $S_{b2}$, $S_{c1}$ and $S_{c2}$ connected to the midpoint, M (8).

A (optional) boost inductor, as $L_a$ (4), an autotransformer, as $T_a$ (5), rectifier diodes, as $D_{a1}$-$D_{a4}$ (6) and bi-directional switches as $S_{a1}$, $S_{a2}$ (7) are building a multi-state switching cell as illustrated and "highlighted" within dashes in FIG. 1.

For each leg, the example configuration of FIG. 1 provides two diodes. The disclosure covers topologies comprising three or more legs, even autotransformers comprising two-legs are illustrated for reasons of simplicity. Having, e.g., three legs the "highlight" area would comprise 6 diodes (6) and 6 bi-directional switches (7). With, e.g., four or five legs the figure would translate to 8 or 10 diodes (6), respectively, and four or five bi-directional switches (7), respectively, etc. The greater the number of legs, the closer to samples of a sinusoid the switched voltage samples will be. Also, the more legs there are the greater is the effective frequency seen by components such as the boost inductors (4). Since the impedance of the inductors depends on frequency on the same scale as inductance, this may be reduced in relation to the number of legs. Of course, the relative reduction for each additional leg will reduce with number of legs included.

The DC-output voltage, referred to as three level output voltage, is charging two groups of capacitors, $C_1$ and $C_2$ (8) connected in series between P and M and N and M respectively. The capacitors are preferably set depending on the load to fulfill required hold-up time and may for an example realization be set to less than 300 μF, e.g. 270 μF.

Figure 2:
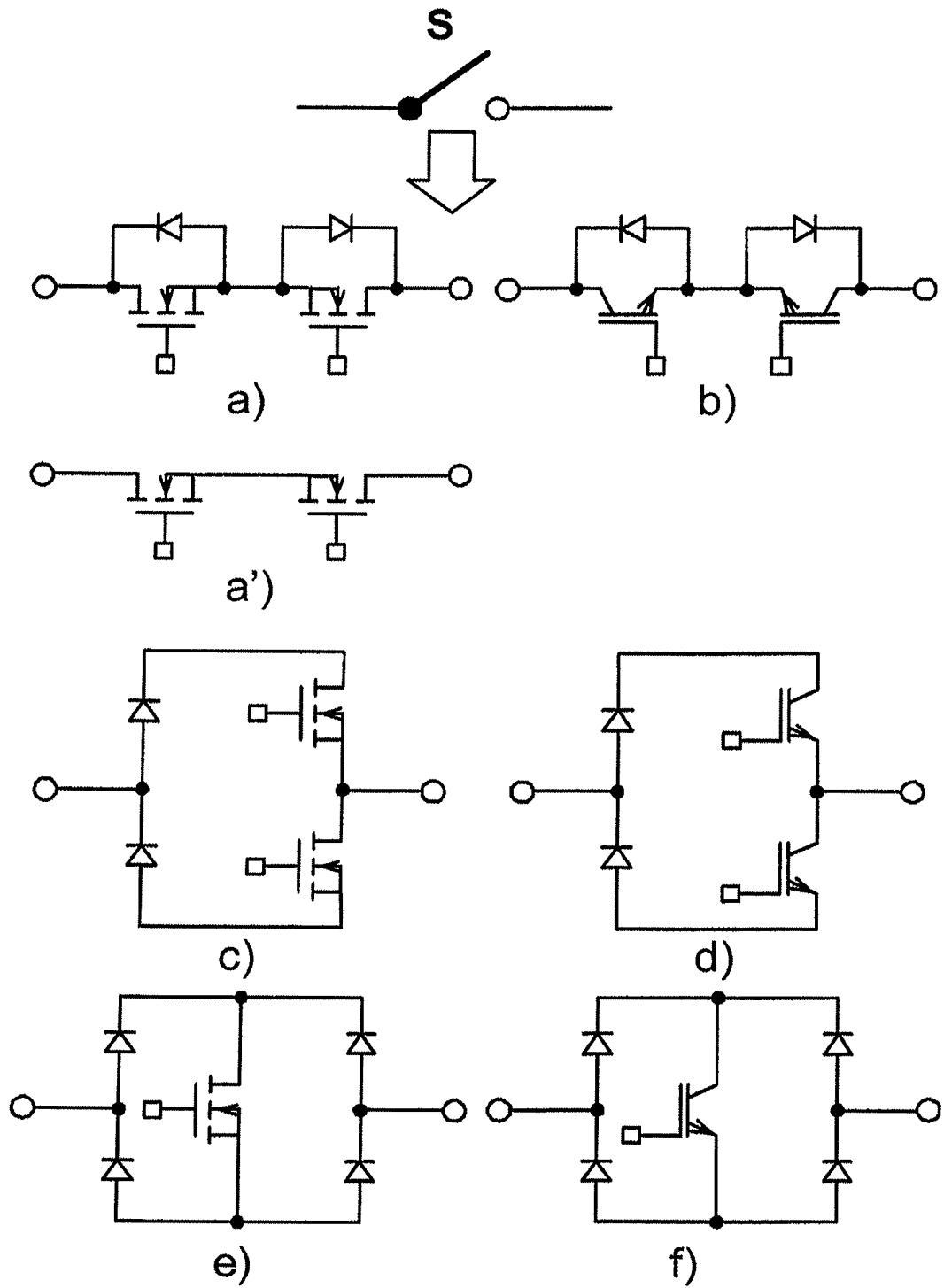
FIG. 2 illustrates example basic formats of bi-directional switches of FIG. 1 in accordance with the disclosure.

The bi-directional switches $S_{a1}, S_{a2}, S_{b1}, S_{b2}, S_{c1}$ and $S_{c2}$ (7) can have for instance the basic formats as schematically illustrated in FIG. 2. To be bi-directional, the switches each comprise two transistors. The diodes of example realization a) are inherent, whereas the diodes of example realizations b)-d) are not. Consequently, the actual realization of a) may be seen as a'). This realization is also the preferred one out of the examples illustrated as it in general provides the smallest resistive loss. The bi-directional switch is opened or closed by the (square) control port.

The embodied Converter is controlled by Continuous Conduction Mode of Operation, CCM. For the control of the converter, Space Vector Modulation or Carrier based Control may be implemented.

Figure 3:
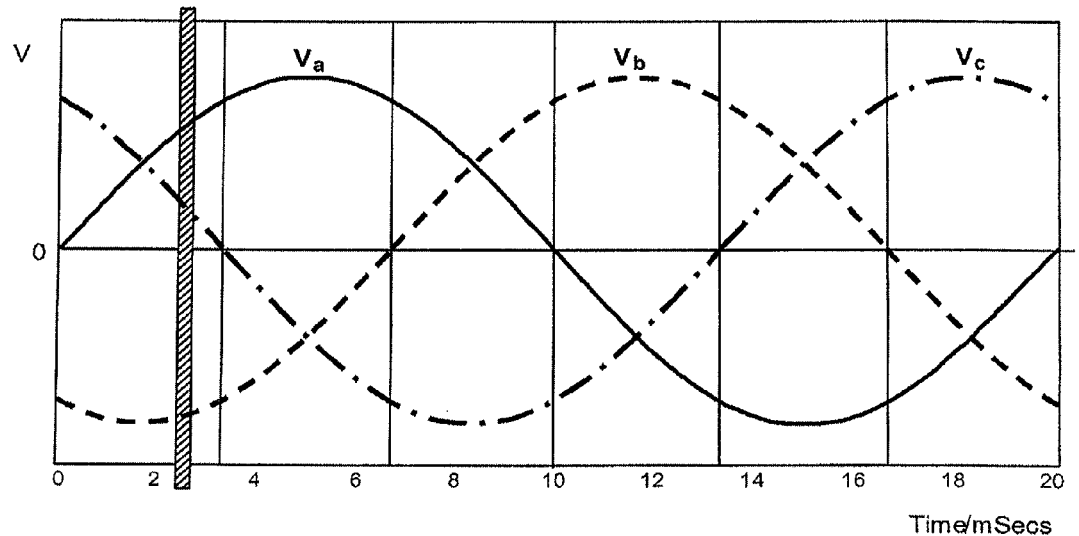
FIG. 3 illustrates one cycle of three phase voltages and an indicated point in time for example analysis/illustration of modes of operation of an embodiment in accordance with the disclosure.
Figure 4:
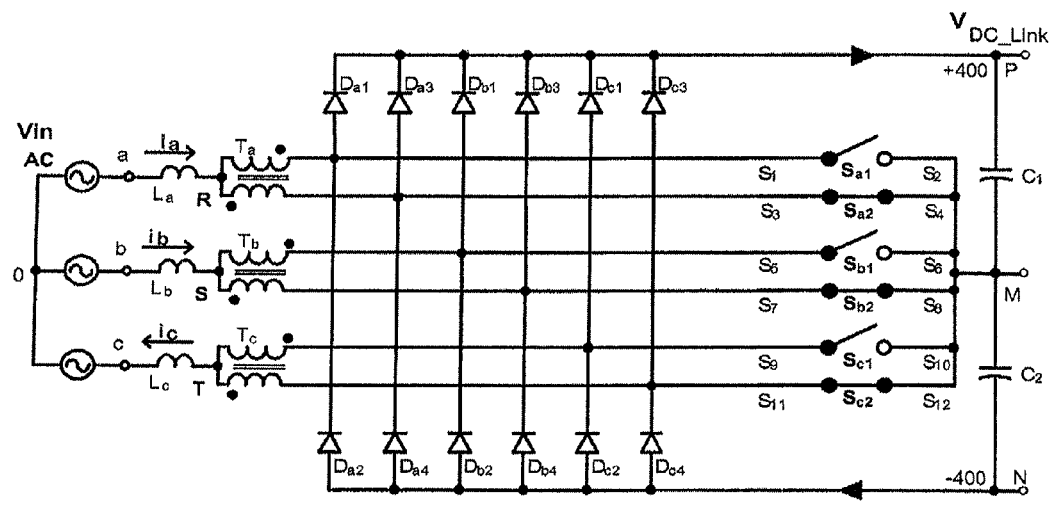
FIG. 4 illustrates a first mode of operation according to a first setting of bidirectional switches $S_{a1}$, $S_{a2}$, $S_{b1}$, $S_{b2}$, $S_{c1}$ and $S_{c2}$ of an embodiment of the disclosure.
Figure 5:
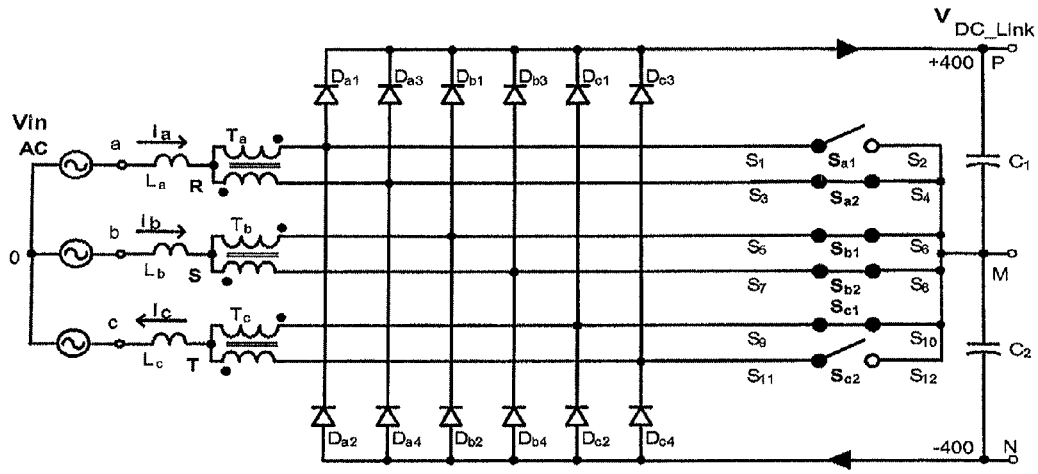
FIG. 5 illustrates a second mode of operation according to a second setting of bidirectional switches $S_{a1}$, $S_{a2}$, $S_{b1}$, $Su_{c1}$ and $S_{c2}$ of an embodiment of the disclosure.
Figure 6:
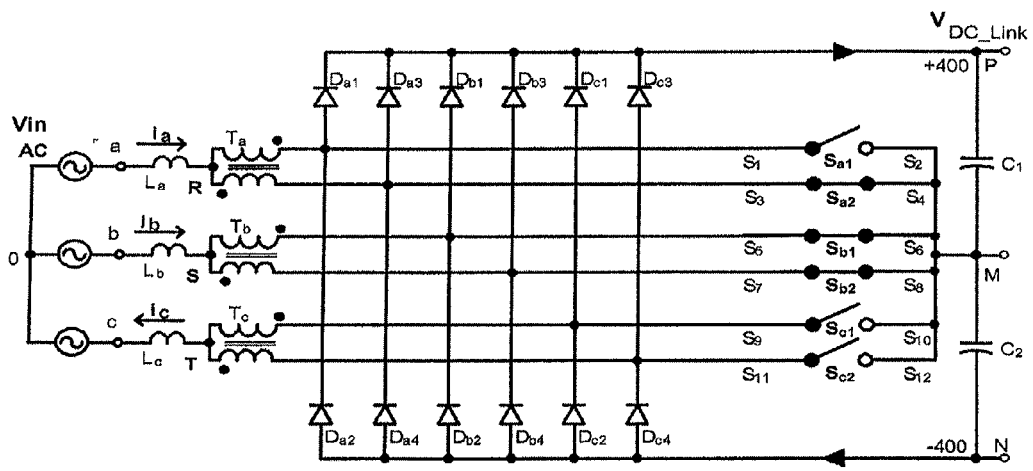
FIG. 6 illustrates a third mode of operation according to a third setting of bidirectional switches $S_{a1}$, $S_{a2}$, $S_{b1}$, $S_{b2}$, $S_{c1}$ and $S_{c2}$ of an embodiment of the disclosure.
Figure 7:
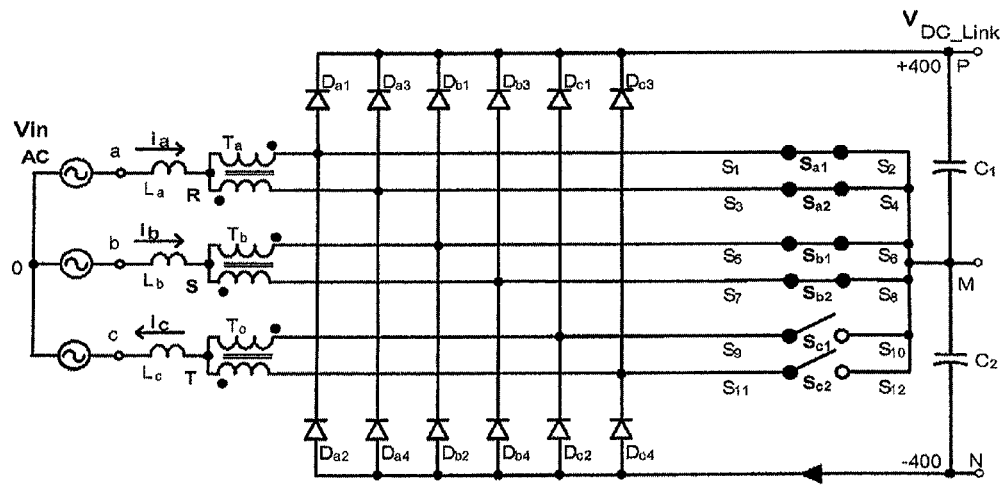
FIG. 7 illustrates a fourth mode of operation according to a fourth setting of bidirectional switches $S_{a1}$, $S_{a2}$, $S_{b1}$, $S_{c1}$ and $S_{c2}$ of an embodiment of the disclosure.
Figure 8:
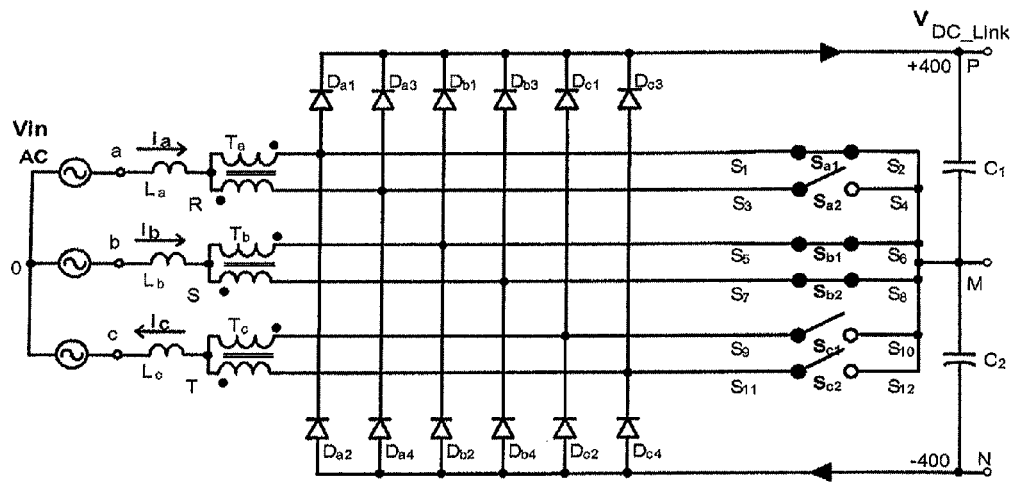
FIG. 8 illustrates a fifth mode of operation according to a fifth setting of bidirectional switches $S_{a1}$, $S_{a2}$, $S_{b1}$, $S_{b2}$, $S_{c1}$ and $S_{c2}$ of an embodiment of the disclosure.
Figure 9:
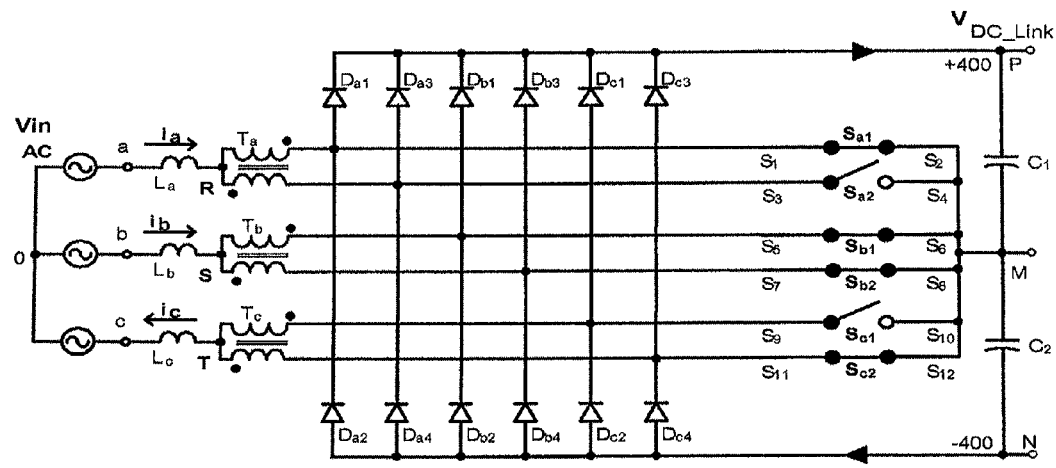
FIG. 9 illustrates a sixth mode of operation according to a sixth setting of bidirectional switches $S_{a1}$, $S_{a2}$, $S_{b1}$, $S_{b2}$, $S_{c1}$ and $S_{c2}$ of an embodiment of the disclosure.
Figure 10:
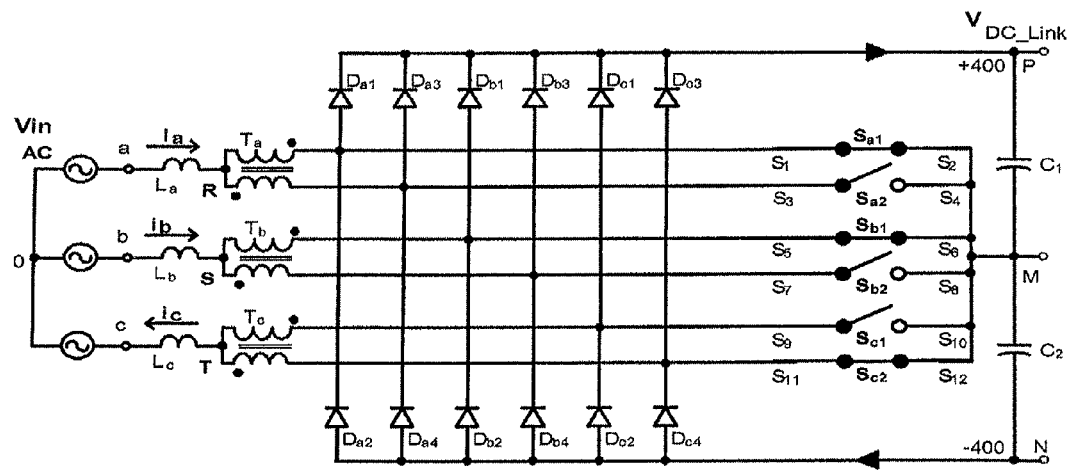
FIG. 10 illustrates a seventh mode of operation according to a seventh setting of bidirectional switches $S_{a1}$, $S_{a2}$, $S_{b1}$, $S_{b2}$, $S_{c1}$ and $S_{c2}$ of an embodiment of the disclosure.

The operation of the converter can be divided into 7 different modes of operation during one half of the total switching period. Example seven modes are provided for an example point in time of the cycle as illustrated in FIG. 3. As the function of the converter in the other half of the total switching period is symmetrical, only 7 modes are illustrated as in FIG. 4 to FIG. 10. In the figures, the switches are preferably realized according to example a') of FIG. 2, and switched by the control current. To simplify reading, leading diodes have been filled and non-leading paths have been dashed.

In this description, certain acronyms and concepts widely adopted within the technical field have been applied in order to facilitate understanding. The disclosure is not limited to units or devices due to being provided particular names or labels. It applies to all methods and devices operating correspondingly. This also holds in relation to the various systems that the acronyms might be associated with.

While the disclosure has been described in connection with specific embodiments thereof, it will be understood that it is capable of combining the various embodiments, or features thereof, as well as of further modifications. This specification is intended to cover any variations, uses, adaptations or implementations of the disclosure; not excluding software enabled units and devices, processing in different sequential order where non-critical, or mutually non-exclusive combinations of features or embodiments; within the scope of subsequent claims following, in general, the principles of the disclosure as would be obvious to a person skilled in the art to which the disclosure pertains.

The invention claimed is:

1. A device comprising:
   an autotransformer inter-connecting each phase to a midpoint, wherein the device corrects power factor of a 3-phase power converter; and the autotransformer comprising two transformer legs, or the autotransformer comprises two transformer windings;
   two diodes connecting each transformer leg to the midpoint, or two diodes connecting each transformer winding to the mid-point; and
   a plurality of controllable bi-directional switches connecting as closed each transformer leg to the midpoint, or a plurality of controllable bi-directional switches connecting as closed each transformer winding to the midpoint,
   wherein two controllable bi-directional switches, each connected to a leg of the autotransformer, the autotransformer and the diodes form a five-state switching cell, or two controllable bi-directional switches, each connected to a winding of the autotransformer, the autotransformer and the diodes form a five-state switching cell.

2. The device according to claim 1, further comprising a low-pass filtering impedance connecting a three-phase input of the device to a midpoint of the output of the device.

3. The device according to claim 1, further comprising a capacitor connecting each phase of a three-phase input of the power converter to a midpoint of the output of the power converter.

4. The device according to claim 1, further comprising bi-directional switches connecting each phase to the midpoint.

5. The device according to claim 1, wherein the respective diodes are connected to the positive and negative side of the output of the power converter.

6. The device according to claim 1, wherein the midpoint is the mid-point of a positive principal voltage and a negative principal voltage, the principal voltage being greater than the line voltage.

* * * * *